June 22, 1954  F. H. STINER  2,681,676
REFRIGERATOR FOR MEAT GRINDERS
Filed Dec. 3, 1951
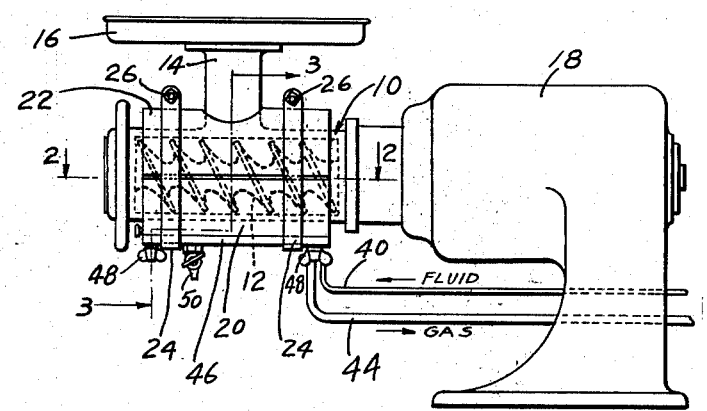
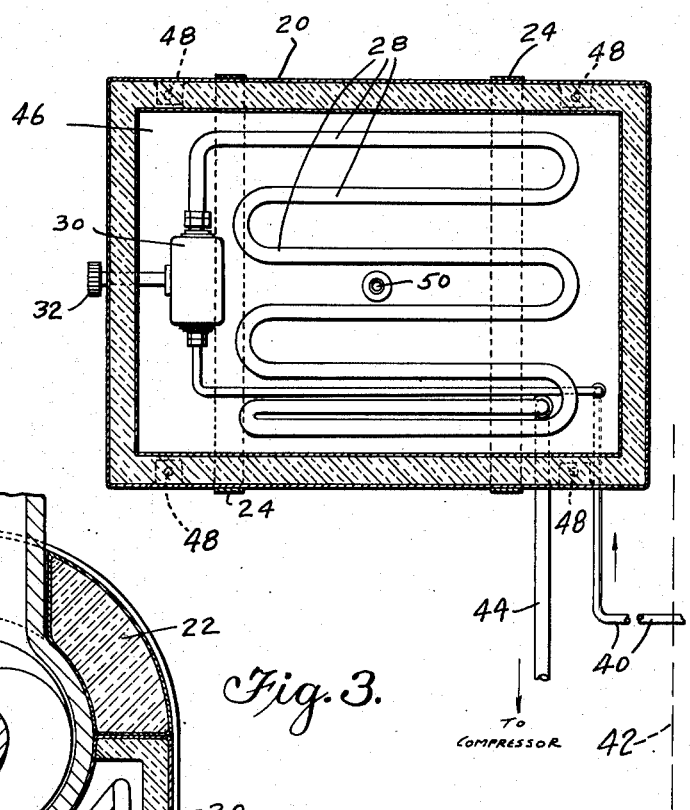
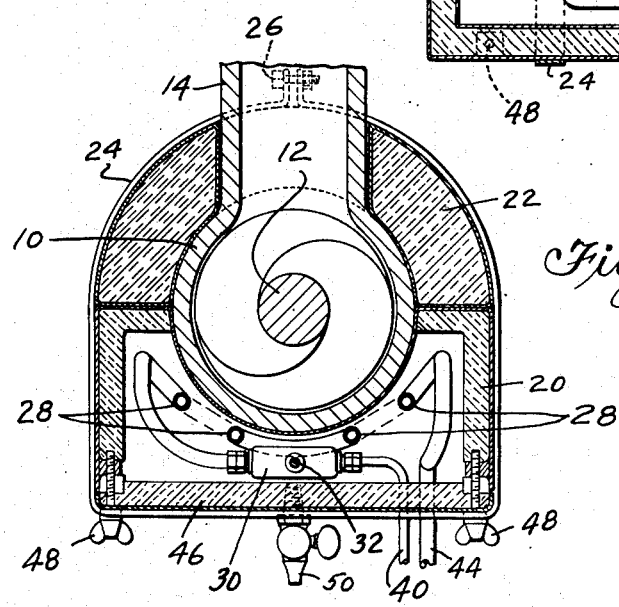
INVENTOR.
Fred H. Stiner.
BY
Albert J. Fihe
ATTORNEY.

Patented June 22, 1954

2,681,676

UNITED STATES PATENT OFFICE 2,681,676

REFRIGERATOR FOR MEAT GRINDERS

Fred H. Stiner, North Hollywood, Calif.

Application December 3, 1951, Serial No. 259,575

1 Claim. (Cl. 146—182)

This invention relates to an improved refrigerator for meat grinders and has for one of its principal objects the provision of means which can be readily associated with the usual meat grinder now almost universally employed in meat markets and the like and which will keep the meat fresh, cold and in good condition at all times.

One of the important objects of this invention is to provide a refrigerated meat grinder which can, at any time, be loaded with a quantity of meat and which meat will then be processed under sanitary conditions and dispensed through the machine at intervals as required.

Another important object of the invention is to provide a refrigerated meat grinder which can always be used in full view of the customer and which need not be taken back and forth from the walk-in cooler or refrigerator every time it is used.

Still another object of the invention is to provide a refrigerated meat grinder which will always maintain the meat ground therein at a desired low temperature to insure that the same will be cut instead of crushed and will not be subjected to deteriorating effects by rise in temperature on account of heat generated therein during the grinding operation.

Yet another object of the invention is the provision of a refrigerating device for meat grinders wherein the meat handled therein will always retain its natural color and sweetness regardless of the number of batches put through the machine or the intervals between grindings or the amount of meat ground at one time.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation view, certain parts being omitted and other parts being shown in dotted lines, of a meat grinder embodying refrigerating principles of my invention.

Figure 2 is an enlarged horizontal sectional view taken on the line 2—2 of Figure 1, looking in the direction indicated by the arrows.

Figure 3 is an enlarged detailed sectional view taken on the broken line 3—3 of Figure 1, looking in the direction indicated.

As shown in the drawings:

The reference numeral 10 indicates generally the cylinder of a meat grinder having the usual screw conveyor 12 therein, and equipped with a tube 14 for feeding thereinto from a pan or other receptacle 16. The device is driven by a motor 18.

In order that the cylinder 10, the screw conveyor 12 and any meat in the grinder be always maintained at a desirably low temperature, a means for refrigerating the same is provided. This comprises an outer casing 20, which is of semi-cylindrical shape and provided with an insulating wall as shown. This casing is adapted to surround the lower half of the cylinder 10 of the grinder and is shaped to correspond as best illustrated in Figure 3.

Cooperating with this lower half is a top shell portion 22, also filled with insulating material, and these two parts are adapted to be held together in position about the cylinder 10 by means of metal straps or the like 24. The straps are fastened by means of nuts or bolts 26, which can be readily removed when desired or necessary.

Fitted into the lower half cylinder 20 is a plurality of refrigerating coils 28, which can be arranged in any suitable manner and can be of various sizes and shapes in order to meet the particular requirements. A preferred arrangement of coils is indicated in Figures 2 and 3, but this is obviously merely representative.

An expansion valve 30 is provided and this can be manually controlled by means of an extending knob or handle 32 so that the temperature of the coils of the grinder generally can be regulated as desired or convenient.

The coils 28 are supplied with a fluid refrigerant through a pipe 40, which may be taken from any convenient place, such as, for example, a meat display case 42, adjacent to the location of the grinder, or a separate refrigerating unit may be employed, depending upon circumstances. After the fluid has been expanded into a gas through the valve 30, it passes through the coils 28 and is returned to the compressor (not shown) by means of return pipes 44, as is usual in these refrigerating systems.

The bottom 46 of the refrigerator casing 20 is preferably made removable and is held in position by a plurality of winged bolts 48, ordinarily positioned at the four corners of the bottom. A drain-cock 50 is incorporated into the bottom, preferably at the lowermost portion thereof, for the purpose of draining off any water which may collect on account of defrosting of the coils 28.

In this way the grinder is maintained at a desired low temperature at all times and the refrigerating unit can be removed from the grinder whenever necessary or desirable or the grinder can be detached from the motor and refrigerating unit for periodical cleaning and repairs whenever necessary.

It will be seen that herein is provided a self-contained unit of refrigeration which can be applied to practically any model of meat grinder now in use in the retail meat industry. Ordinarily, without refrigeration, any meat left in a grinder of this type will soon discolor and eventually reach a stage of contamination. This is usually due to a temperature rise which may sometimes be on account of surrounding conditions and always results from the grinding operation itself. This means a loss to the market operator, because such meat must be discarded every time the grinder is used when in this condition.

Furthermore, a considerable quantity of meat must be ground before it is able to retain its original color and desired freshness throughout the grinding operation.

A device of this type will insure against disappointed and dissatisfied customers, will eliminate waste and will comply with all sanitary and health regulations.

The refrigerating unit, instead of being below the grinder cylinder, can be above the same, or two refrigerating units may be employed, adapted to be clamped about the grinder, either above and below the same or on both sides thereof. The grinder cylinder may also be made integral with the refrigerating unit, while at the same time be removable from the actuating motor and with the internal parts, such as the screw conveyor and the cutting plates, readily removable.

While the device is primarily intended for use with meat grinders, it can be employed in any and all cases where such protection, as for other foods or even chemical compositions, must be kept cool while being processed as by grinding or the like.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A refrigerator for meat grinders, including a casing adapted to fit on to the bottom of the grinder cylinder, refrigerating coils in the casing, a second casing composed practically entirely of insulating material adapted to fit about the top portion of the grinder cylinder, encircling bands and fastening nuts for releasably retaining the two casings in operating position, control means for the refrigerant in the coils, a motor for driving the grinder, the refrigerating unit, the grinder and its associated parts all being separable from the motor, and a removable bottom and a drain cock in the casing for the refrigerated coils.

References Cited in the file of this patent

UNITED STATES PATENTS

| Number | Name | Date |
| --- | --- | --- |
| 1,004,490 | Steele | Sept. 26, 1911 |
| 1,942,082 | Biancalana | Jan. 2, 1934 |
| 1,942,083 | Biancalana | Jan. 2, 1934 |
| 2,060,605 | Biancalana | Nov. 10, 1936 |
| 2,333,669 | Ness | Nov. 9, 1943 |
| 2,526,498 | Pacciano | Oct. 17, 1950 |

FOREIGN PATENTS

| Number | Country | Date |
| --- | --- | --- |
| 968,712 | France | May 3, 1950 |